Aug. 8, 1950   R. O. ANDERSON   2,517,621
APPARATUS FOR ABSORBING SHOCK LOADS
Filed Jan. 5, 1946   5 Sheets-Sheet 1

Inventor:
Rexford O. Anderson,
By Dawson, Booth & Spangenberg,
Attorneys.

Aug. 8, 1950     R. O. ANDERSON     2,517,621
APPARATUS FOR ABSORBING SHOCK LOADS
Filed Jan. 5, 1946     5 Sheets-Sheet 2
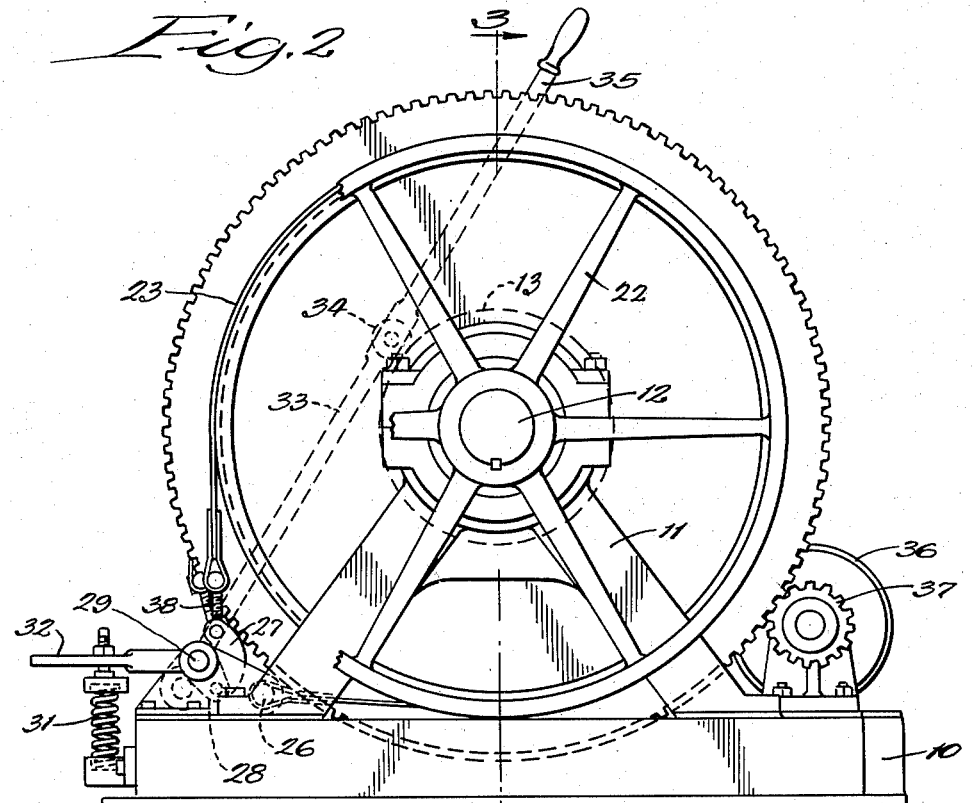
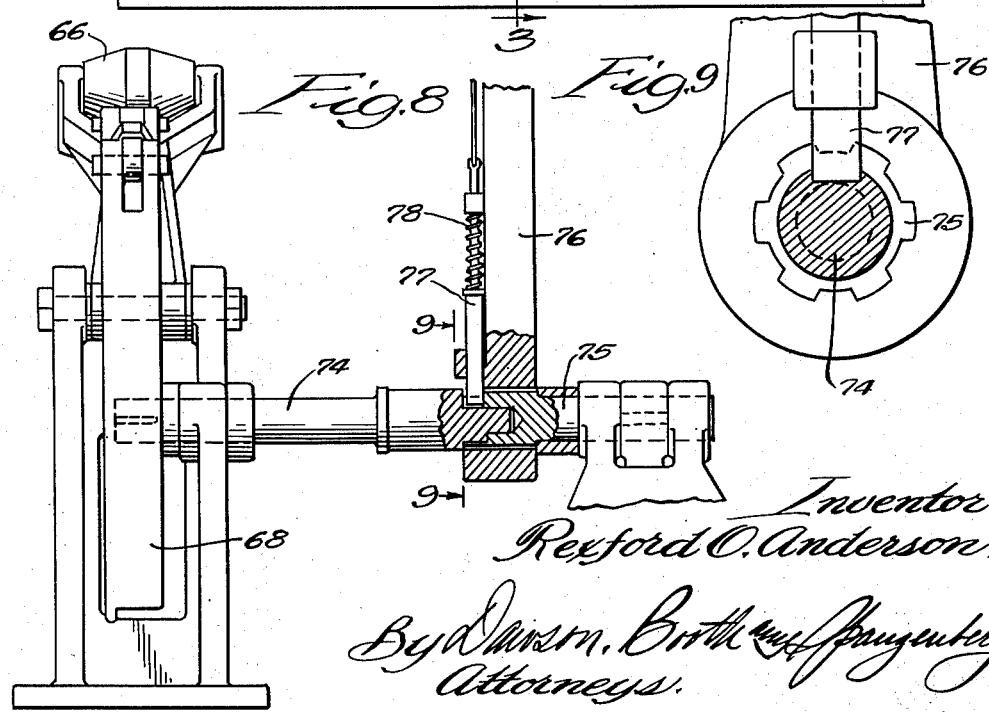
Inventor:
Rexford O. Anderson,
By Dawson, Birth and Spangenberg,
Attorneys.

Aug. 8, 1950     R. O. ANDERSON     2,517,621
APPARATUS FOR ABSORBING SHOCK LOADS
Filed Jan. 5, 1946     5 Sheets-Sheet 3
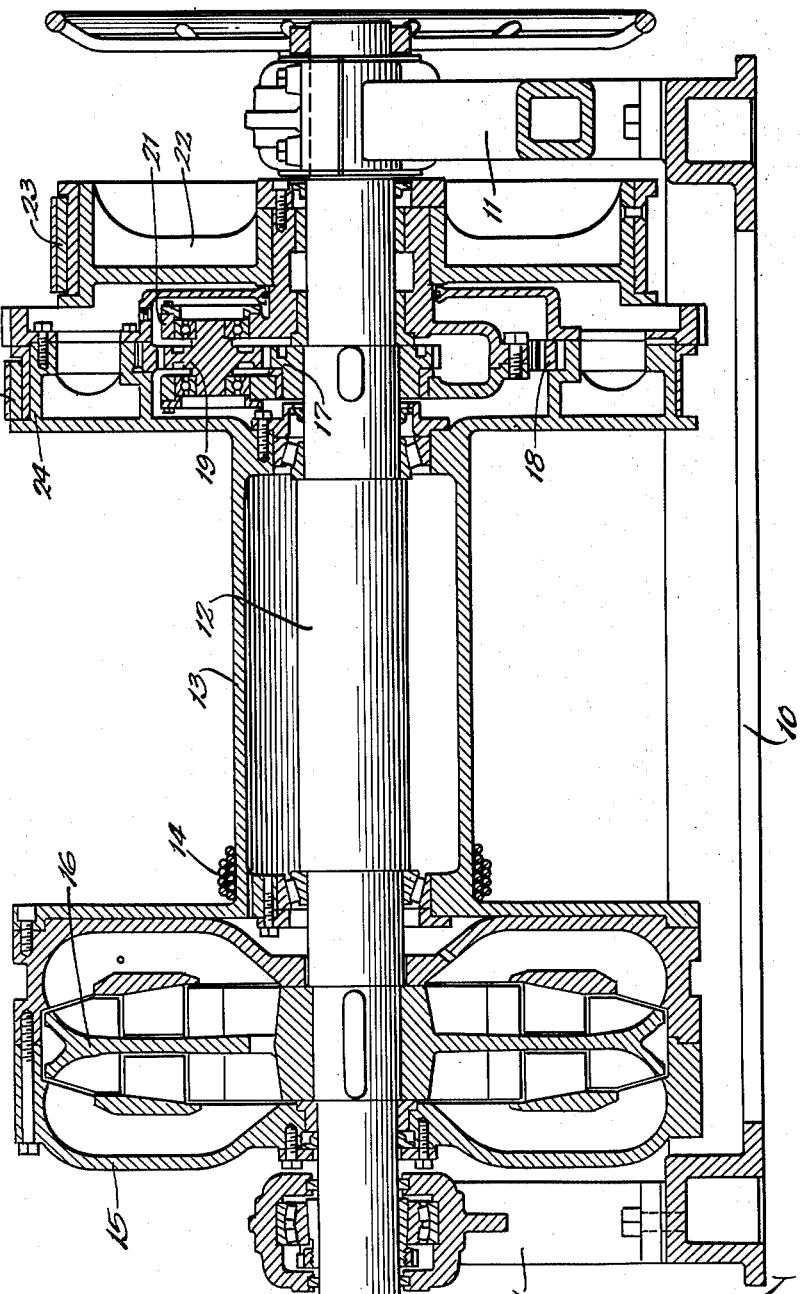
Inventor:
Rexford O. Anderson,
By Dawson, Bootham Spangenberg
Attorneys.

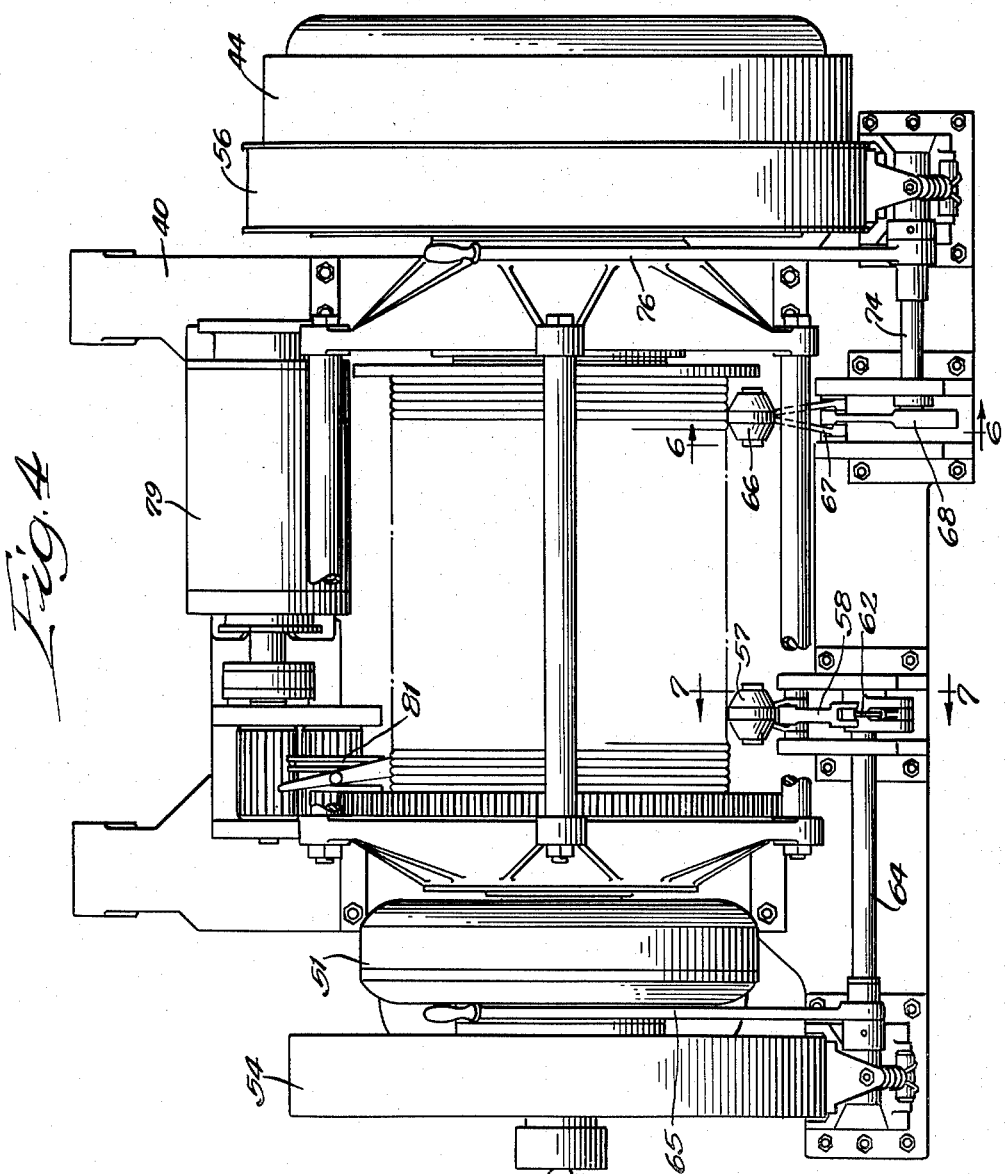

Aug. 8, 1950   R. O. ANDERSON   2,517,621
APPARATUS FOR ABSORBING SHOCK LOADS
Filed Jan. 5, 1946   5 Sheets-Sheet 5
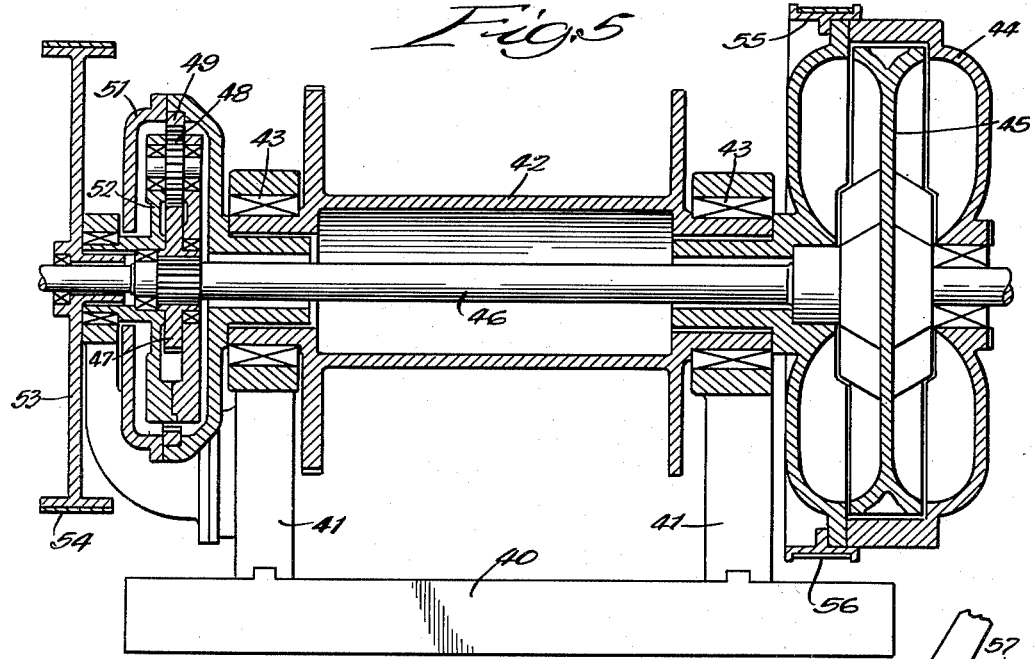
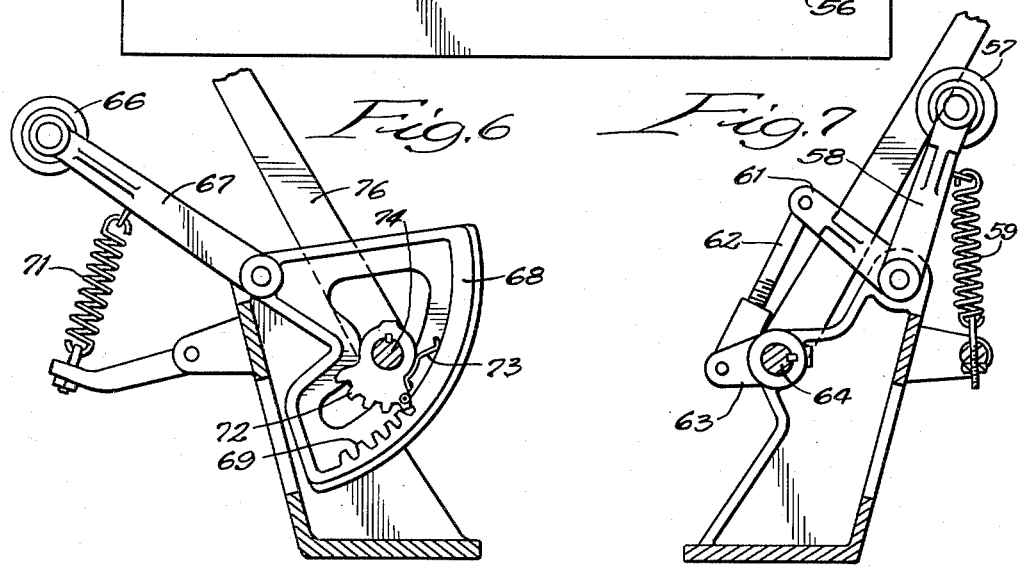
Inventor:
Rexford O. Anderson,
By Dawson, Booth and Spangenberg,
Attorneys.

Patented Aug. 8, 1950

2,517,621

UNITED STATES PATENT OFFICE 2,517,621

APPARATUS FOR ABSORBING SHOCK LOADS

Rexford O. Anderson, Chicago, Ill., assignor to Foote Bros. Gear and Machine Corporation, Chicago, Ill., a corporation of Delaware Application January 5, 1946, Serial No. 639,209

18 Claims. (Cl. 254—173)

This invention relates to apparatus for absorbing shock loads and more particularly to pick up devices for use in aircraft for picking up a load in flight or for bringing a moving aircraft or the like to rest.

One of the objects of the invention is to provide apparatus for absorbing shock loads in which the major portion of the energy involved is absorbed by a main braking means, and an auxiliary braking means is provided to absorb the final energy and to hold the parts of the apparatus against further movement.

Another object is to provide apparatus for absorbing shock loads which is automatically controlled first to make the main braking means effective and thereafter to engage the auxiliary brake to bring the apparatus to a full stop.

Still another object is to provide apparatus for absorbing shock loads in which the main and auxiliary braking means are controlled in accordance with withdrawal of cable from the reel in response to the diameter of cable on the reel.

A further object is to provide apparatus for absorbing shock loads in which the brakes may be manually released for rewinding and reset for succeeding operations.

A still further object is to provide apparatus for absorbing shock loads in which the major part of the energy is absorbed hydraulically, and the final stopping of the apparatus is effected by a mechanical brake.

The above and other objects and advantages of the invention will be more readily apparent from the following description when read in connection with the accompanying drawings, in which—

Figure 2 is an end elevation looking from the right of Figure 1;

Figure 3 is an axial section on the line 3—3 of Figure 2;

Figure 4 is a top plan view of an alternative construction;

Figure 5 is an axial section through the apparatus of Figure 4;

Figure 1:
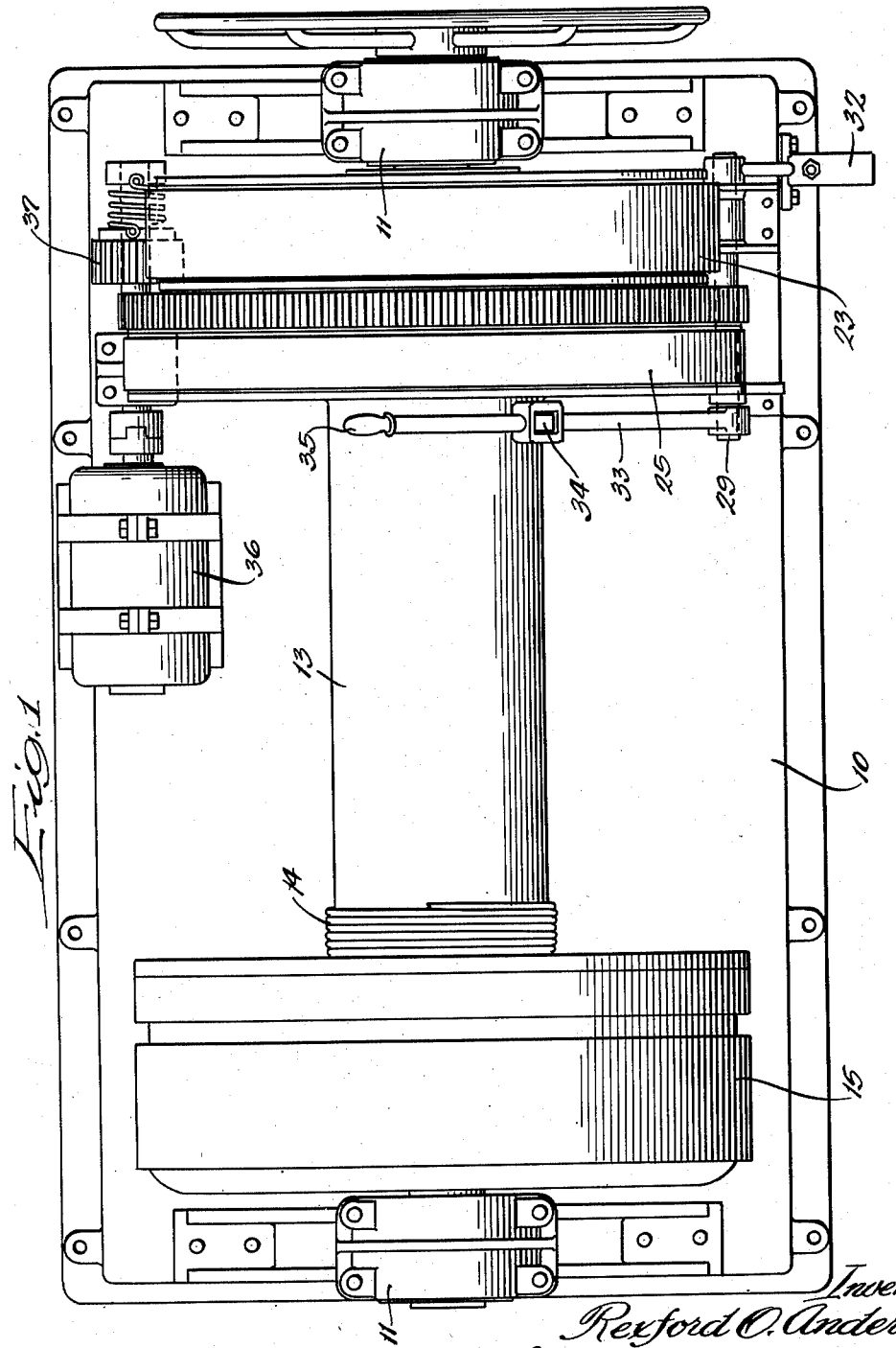
Figure 1 is a top plan view of an apparatus embodying the invention.

Figures 6 and 7 are partial sections on the lines 6—6 and 7—7 respectively of Figure 4, showing the brake operating mechanism;

Figure 8 is an elevation of one of the brake operating devices with parts in section; and Figure 9 is a partial section on the line 9—9 of Figure 8.

The apparatus as shown in Figures 1 to 3 comprises a base 10 which may be mounted in an aircraft or in any other desired point of use and which is formed at its ends with uprights or pedestals 11 supporting bearings in which a through shaft 12 is journaled. The shaft 12 supports a reel 13 between the uprights on which a cable, as indicated at 14, is adapted to be wound. The cable may extend from the aircraft to be connected to a load, as, for example, through a hook which engages a loop or the like on the load, whereby the load will be picked up by the cable. When the apparatus is used for stopping moving aircraft or the like, the cable may be connected to a hook or the like on the moving aircraft. In either case the cable is connected to the load and is adapted to absorb the shock energy incident to the connection of one moving body with another body which is stationary with respect thereto. In this respect the present construction is similar to those more particularly described and claimed in the patents to Anderson et al., No. 2,396,071 and No. 2,429,253.

According to the present invention, rotation of the reel 13 produced with withdrawal of the cable therefrom upon connection of the cable to a load is adapted to be stopped by a main brake mechanism which absorbs the major part of the energy involved and an auxiliary brake mechanism which brings the reel to a full stop. The main brake mechanism, as shown, comprises a hydraulic torque transmitting unit including a hollow vaned casing 15 which is connected to the reel 13 and is journaled on the shaft 12. Within the casing is a vaned rotor element 16 which is keyed to the shaft 12 for rotation in the casing 15. It will be understood that the casing 15 is filled or partially filled with liquid so that when the rotor is turning energy will be transmitted between the casing and the rotor.

To increase the relative rotation between the rotor 16 and the casing 15, a reversing gear is provided including a sun gear 17 connected to the shaft 12, a ring gear 18 connected to the reel 13 and planet pinions 19 meshing with the sun and ring gears. The pinions 19 are rotatably supported on a carrier 21 which is connected to a brake 22 adapted to be engaged by a brake band 23 to hold it stationary. When the brake band 23 is disengaged, the carrier 21 is free to rotate so that the rotor 16 is also free to rotate. However, when the brake 23 is engaged, the carrier will be held stationary and the shaft 12 will be turned in a direction reverse to that of the reel 13 so that the rotor 16 will turn in one direction while the casing 15 turns in the opposite direction to produce a high braking torque on the reel.

To bring the reel to a final stop after the hydraulic unit has brought it partially to a stop, one end of the reel is formed with a brake flange 24 engaged by a brake band 25. When the band 25 is engaged, the reel will be held against rotation so that no cable can be withdrawn therefrom.

The brakes 23 and 25 are controlled to operate in sequence in response to withdrawal of cable from the reel. Similar mechanisms can be employed for this purpose which are differently adjusted to produce timed operation, one such mechanism for controlling the brake 23 being shown in Figure 2. As shown in this figure, one end of the brake band 23 is fastened to a fixed anchor pin 26 while the other end is adjustably pivoted to an operating link 27. The operating link 27 is pivoted at one end to an operating arm 28 having a one-way or loosely keyed connection with a shaft 29 which lies parallel to the axis of the reel. A spring 31 may engage an arm 32 on the shaft 29 to turn it in a clockwise direction as seen in Figure 2 to apply the brake. When the shaft 29 is turned in a clockwise direction, the arm 28 will pull down on the link 27 to tighten the band 23 on the drum 22 thereby holding the drum stationary. The mechanism for the brake 25 may be similar, but is preferably so connected to the shaft 29 as to produce operation of the brake 23 prior to that of the brake 25.

According to the present invention, the brakes are controlled in response to the withdrawal of cable from the drum by operating the brakes according to the diameter of cable on the drum. For this purpose a lever 33 is connected to the shaft 29 and carries a roller 34 which is adapted to ride against the cable on the drum. When the drum is full, the lever will be swung away from it to rock the shaft 29 in a direction to release both brakes so that the reel can turn freely. Upon connection of the cable to a load and withdrawal of cable from the reel, the lever will swing in toward the reel rocking the shaft 29 in a direction to engage the brakes. Preferably the operating mechanism for the brake 23 is so adjusted that this brake will be engaged upon initial withdrawal of cable from the drum so that it will be applied promptly to bring the hydraulic unit into effect to resist rotation of the drum. After engagement of the brake 23, the shaft 29 can continue to turn due to the one-way or loosely keyed connection with the arm 28. In picking up loads from a moving aircraft, the drum will be brought quickly to a relatively high speed at which time the hydraulic unit will become effective to apply a braking force to the reel, tending to slow it down. After a predetermined amount of cable has been withdrawn from the reel, sufficient to permit the hydraulic unit to bring the reel substantially to a stop, the lever 33 will have turned the shaft 29 to a position to permit engagement of the brake 25 to bring the reel to a full stop. When the brake 25 has been applied, a load engaged by the cable can be towed by the aircraft or in the case of stopping a moving aircraft or the like the moving device will have been brought to a full stop. With this construction it will be seen that the braking force is applied smoothly and progressively and that the major braking effort is produced hydraulically so that most of the energy involved in a pick up or like operation is absorbed by the liquid carried by the hydraulic unit. Since the friction brakes are called upon only to absorb relatively small quantities of energy, they may be made of fairly simple construction and need not have an involved expensive cooling means associated therewith.

For rewinding the cable on the reel, the brakes may be released and reset by a manual lever 35 which may be an extension of the arm 33 carrying the roller 34. When this lever is clasped by the operator and swung in a counterclockwise direction, as seen in Figure 2, the shaft 29 will be rocked to release both of the brakes. At this time the reel can be turned freely through a rewind motor 36 which may connect to the reel through a releasable pinion 37 to wind the cable back on to the reel. When the reel is again filled with cable, the lever 35 may be released so that the roller 34 will engage the cable, and the brakes will be reset for the next succeeding operation. Adjustment of the brakes to determine the times when they will be engaged can be accomplished by the threaded connections 38 by which the links 27 are connected to the ends of the brake bands.

The construction shown in Figures 4 to 9 is similar to that of Figures 1 to 3 and operates in substantially the same manner. This construction comprises a base 40 carrying a pair of spaced uprights 41 between which a reel 42 is suspended. As best seen in Figure 5, the reel is formed at its ends with hollow hub portions which are journaled in bearings 43 in the uprights 41 so that the reel is directly supported by the uprights.

The main braking means of the construction shown in Figures 4 to 9 comprises a hydraulic unit having a hollow vaned casing 44 connected directly to the hub at one end of the reel and within which a vaned rotor 45 is mounted. The rotor 45 is connected to a shaft 46 which extends loosely through the reel and carries a sun gear 47 at the opposite end of the unit. The sun gear 47 meshes with pinions 48 which in turn mesh with a ring gear 49 in a casing 51. The casing 51 is connected directly to the hub at the opposite end of the reel.

The pinions 48 are rotatably supported by a carrier 52 which is connected to a brake drum 53 engageable by a brake band 54. When the brake 54 is disengaged, the rotor 45 may turn freely, but when the brake 54 is engaged, the rotor 45 will be turned through the gear in a direction opposite to that of the casing 44 to produce a highly effective hydraulic braking of the reel.

To bring the reel to a full stop, the casing 44 carries a brake drum 55 which may be engaged by a brake band 56. When the brake 56 is engaged, the reel will be held against rotation for towing a load or the like.

The brake 54 is controlled by a follower 57 carried by a lever 58 and urged into engagement with cable on the reel by a spring 59. An arm 61 is connected to the lever 58 and is connected through a link 62 to an arm 63 on an operating shaft 64. The shaft 64 is connected to the brake band 54 to engage the brake band when the arm 58 swings in a clockwise direction, as seen in Figure 7.

To disengage the brake 54 for rewinding cable on the drum and for resetting the brake, a manually operable lever 65 is mounted on the shaft 64. When the lever 65 is swung out by an operator, it will disengage the brake 54 so that the reel can be turned freely during rewinding and so that the follower will be reset for a subsequent operation.

The brake 56 is similarly controlled by a follower 66 mounted on a lever 67 which is formed with a hollow arcuate extension 68 having gear teeth 69 extending throughout a portion of its length. A spring 71 maintains the follower 66 in engagement with cable on the reel. The gear teeth 69 are adapted to engage the teeth on a gear segment 72 which may carry a spring 73 urging it to turn in a direction to mesh its teeth with the teeth 69. The segment 72 is mounted on a shaft 74 which is journaled at its outer end in a short shaft 75 to which the operating mechanism for the brake 56 is connected. The shaft section 75 carries a manual operating lever 76 which is keyed to the end of the shaft section 75 and which carries a slidable keeper 77 adapted to extend through an opening in the shaft 75 into a notch in the shaft 74 to connect the two shafts together. Normally the keeper is urged down to its latching position by a spring 78, as shown in Figure 8, and may be released by a handle member on the outer end of the lever when desired. It will be understood that the lever 65 may be similarly constructed to disconnect the shaft section 64 from its brake operating mechanism when desired.

In making a pick up or like operation with the apparatus of Figures 4 to 9, the cable is connected to the load causing the reel to rotate rapidly as cable is withdrawn therefrom. In the initial part of the cable withdrawal the followers 57 and 66 will move inward toward the reel causing the brake 54 to be engaged promptly through the linkage 61—63 and the shaft 64. The hydraulic mechanism, therefore, becomes effective after a relatively small amount of cable has been withdrawn from the reel to apply a hydraulic braking force to the reel tending to bring it to a stop.

During initial withdrawal of cable from the reel, the segment 72 will slide over the smooth part of the arcuate extension 68 until its end tooth meshes with the first of the teeth 69, as shown in Figure 6. During this initial movement the shaft 74 will not be turned, and the brake 56 will not be applied. After engagement of the segment 72 with the teeth 69, further movement of the follower 66 will cause the shaft 74 to rotate to bring the brake 56 into engagement. When this brake is engaged, the reel will be brought to a full stop.

For rewinding and resetting, the levers 65 and 76 may be swung outward to disengage the brakes thereby freeing the reel. In this operation the keepers 77 may be slid outward to disconnect the shaft sections 74 and 75 so that the operator is not required to overcome the springs holding the followers against the cable to minimize the manual effort involved. As soon as the brakes are released by operating the levers 65 and 76, the cable may be rewound on the reel, and upon reconnecting the shaft sections 74 and 75, the apparatus will be reset for a subsequent operation. Rewinding may be effected by a motor 79 connected to a gear on the reel through a clutch mechanism 81.

While two embodiments of the invention have been shown and described in detail, it will be understood that they are illustrative only and are not intended as definition of the scope of the invention, reference being had for this purpose to the appended claims.

What is claimed is:

1. A pick up device of the character described for use on an aircraft for picking up a load in flight comprising a reel containing a length of pick up cable thereon, main brake means for controlling the unwinding of said reel, auxiliary brake means for holding said reel against movement when the load has been picked up, means for automatically applying said auxiliary brake means when the unwinding of said cable has been substantially stopped by said main brake, and means under control of the operator for presetting said auxiliary brake means to provide for the automatic application thereof.

2. Apparatus for absorbing shock loads comprising a reel, a cable wound on the reel, means on the end of the cable for connecting it to a load, a fluid transmission having one element connected to the reel, a brake connected to the other element of the fluid transmission, a brake connected to the reel, and control means for the brakes operable in response to withdrawal of cable from the reel first to engage the first named brake and thereafter to engage the last named brake.

3. Apparatus for absorbing shock loads comprising a reel, a cable wound on the reel, means on the end of the cable for connecting it to a load, a fluid transmission having one element connected to the reel, a brake connected to the other element of the fluid transmission, a brake connected to the reel, and control means for the brakes operable in response to the diameter of the cable on the reel to engage the first named brake and thereafter to engage the last named brake.

4. Apparatus for absorbing shock loads comprising a reel, a cable wound on the reel, means on the end of the cable for connecting it to a load, a fluid transmission having one element connected to the reel, a brake connected to the other element of the fluid transmission, a brake connected to the reel, a follower engaging the cable on the reel and connected to the first named brake to engage it when the diameter of the cable on the reel is less than a predetermined size, and a second follower engaging the cable on the reel and connected to the last named brake to engage it when the diameter of the cable on the reel reaches a predetermined smaller size.

5. Apparatus for absorbing shock loads comprising a reel containing a length of cable which is adapted to be connected to a load, main brake means connected to the reel to resist unwinding rotation thereof, auxiliary brake means connected to the reel to hold the reel against rotation, means for automatically applying the auxiliary brake means after the main brake means has substantially stopped unwinding rotation of the reel, and manually operable means for releasing the auxiliary brake means to permit rewinding of the cable and to reset the auxiliary brake.

6. Apparatus for absorbing shock loads comprising a reel containing a length of cable which is adapted to be connected to a load, main brake means connected to the reel to resist unwinding rotation thereof, auxiliary brake means connected to the reel to hold the reel against rotation, means for applying the main brake means and for thereafter automatically applying the auxiliary brake means after the main brake means has substantially stopped unwinding rotation of the reel, and manually operable means for releasing the main and auxiliary brake means for rewinding of the cable and to reset the brake means.

7. Apparatus for absorbing shock loads comprising a reel containing a length of cable which is adapted to be connected to a load, main brake means connected to the reel to resist unwinding rotation thereof, auxiliary brake means connected to the reel to hold the reel against rotation, and means operable automatically in response to unwinding of cable from the reel to apply the main brake means and thereafter to apply the auxiliary brake means.

8. Apparatus for absorbing shock loads comprising a reel containing a length of cable which is adapted to be connected to a load, main brake means connected to the reel to resist unwinding rotation thereof, auxiliary brake means connected to the reel to hold the reel against rotation, means operable automatically in response to unwinding of cable from the reel to apply the main brake means and thereafter to apply the auxiliary brake means, and manually operable means to release the brake means for rewinding of the cable and to reset the brake means.

9. Apparatus for absorbing shock loads comprising a reel containing a length of cable which is adapted to be connected to a load, main brake means connected to the reel to resist unwinding rotation thereof, auxiliary brake means connected to the reel to hold the reel against rotation, a follower engageable with the cable on the reel, and means operated by the follower first to apply the main brake means and thereafter to apply the auxiliary brake means as cable is withdrawn from the reel.

10. Apparatus for absorbing shock loads comprising a reel containing a length of cable which is adapted to be connected to a load, main brake means connected to the reel to resist unwinding rotation thereof, auxiliary brake means connected to the reel to hold the reel against rotation, a follower engageable with the cable on the reel, means operated by the follower first to apply the main brake means and thereafter to apply the auxiliary brake means as cable is withdrawn from the reel, and manually operable means connected to the follower to move it away from the reel to release the brake means for rewinding.

11. Apparatus for absorbing shock loads comprising a reel containing a length of cable which is adapted to be connected to a load, main brake means connected to the reel to resist unwinding rotation thereof, auxiliary brake means connected to the reel to hold the reel against rotation, and a pair of followers engageable with the cable on the reel and connected respectively with the brake means to control them, the connections being so adjusted that during unwinding of cable the main brake means will be first applied and thereafter the auxiliary brake means will be applied.

12. Apparatus for absorbing shock loads comprising a reel containing a length of cable which is adapted to be connected to a load, main brake means connected to the reel to resist unwinding rotation thereof, auxiliary brake means connected to the reel to hold the reel against rotation, a pair of followers engageable with the cable on the reel and connected respectively with the brake means to control them, the connections being so adjusted that during unwinding of cable the main brake means will be first applied and thereafter the auxiliary brake means will be applied, and manually operable means to move the followers away from the reel to release the brake means for rewinding.

13. Apparatus for absorbing shock loads comprising a reel containing a cable which is adapted to be connected to a load, a hydraulic torque transmitting unit including two relatively rotatable elements, means connecting one of the elements to the reel, a first brake, means connecting the other element to the first brake, a second brake connected to the reel, control means automatically to engage the first brake and thereafter to engage the second brake as cable is withdrawn from the reel, and manually operable means to release the brakes for rewinding the cable and for resetting the brakes.

14. Apparatus for absorbing shock loads comprising a reel containing a cable which is adapted to be connected to a load, a hydraulic torque transmitting unit including two relatively rotatable elements, means connecting one of the elements to the reel, a first brake, means connecting the other element to the first brake, a second brake connected to the reel, means responsive to the diameter of cable on the reel first to apply the first brake and thereafter to apply the second brake as cable is withdrawn from the reel, and manual means to release the brakes for rewinding cable on the reel.

15. Apparatus for absorbing shock loads comprising a reel containing a cable which is adapted to be connected to a load, a hydraulic torque transmitting unit including two relatively rotatable elements, means connecting one of the elements to the reel, a first brake, means connecting the other element to the first brake, a second brake connected to the reel, a follower engageable with cable on the reel and connected to the brakes to apply the first brake and thereafter to apply the second brake as cable is withdrawn from the reel, and manual means to release the brakes for rewinding cable on the reel.

16. Apparatus for absorbing shock loads comprising a reel containing a cable which is adapted to be connected to a load, a hydraulic torque transmitting unit connected to the reel, a brake connected to the reel, and automatic control means operable in response to withdrawal of cable from the reel for the hydraulic unit and the brake first to control the hydraulic unit yieldingly to resist unwinding rotation of the reel and thereafter to apply the brake to hold the reel against rotation.

17. Apparaus for absorbing shock loads comprising a reel containing a cable which is adapted to be connected to a load, a hydraulic torque transmitting unit connected to the reel, a brake connected to the reel, and automatic control means operable in response to withdrawal of cable from the reel for the hydraulic unit and the brake first to control the hydraulic unit yieldingly to resist unwinding rotation of the reel and thereafter to apply the brake to hold the reel against rotation, and manual means to release the brake for rewinding cable on the reel and to reset the brake.

18. Apparatus for absorbing shock loads comprising a reel containing a cable which is adapted to be connected to a load, a hydraulic torque transmitting unit connected to the reel, a brake connected to the reel, and automatic control means operable in response to withdrawal of cable from the reel first to control the hydraulic unit yieldingly to resist unwinding rotation of the reel and thereafter to apply the brake to hold the reel against rotation.

REXFORD O. ANDERSON.

REFERENCES CITED

The following references are of record in the file of this patent:

UNITED STATES PATENTS

| Number | Name | Date |
|---|---|---|
| 1,992,912 | De La Mater | Feb. 26, 1935 |
| 2,396,071 | Anderson et al. | Mar. 5, 1946 |